United States Patent

Hildebrand et al.

[11] Patent Number: 5,943,459
[45] Date of Patent: *Aug. 24, 1999

[54] OPTICAL COUPLING ARRANGEMENT

[75] Inventors: Olaf Hildebrand, Stuttgart; Walter Hoffmann, Weil der Stadt; Hans-Peter Mayer, Korntal; Werner Rehm, Stuttgart; Klaus Wünstel, Schwieberdingen, all of Germany

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/531,547

[22] Filed: Sep. 18, 1995

[30] Foreign Application Priority Data

Sep. 21, 1994 [DE] Germany .................. 44 33 605

[51] Int. Cl.⁶ .................................................. G02B 6/12
[52] U.S. Cl. .................. 385/50; 385/14; 385/39; 385/47; 385/37
[58] Field of Search ............... 385/50, 14, 39, 385/47, 48, 37; 372/99; 200/61.45

[56] References Cited

U.S. PATENT DOCUMENTS

| | | | |
|---|---|---|---|
| 4,265,541 | 5/1981 | Leclerc et al. | 385/14 |
| 4,748,687 | 5/1988 | Auracher et al. | 372/99 |
| 4,750,799 | 6/1988 | Kawachi et al. | 385/14 |
| 4,846,542 | 7/1989 | Okayama et al. | 350/96.15 |
| 4,860,294 | 8/1989 | Winzer et al. | 385/37 |
| 4,927,222 | 5/1990 | Kamiya et al. | 385/50 |
| 5,002,354 | 3/1991 | Koai | 350/96.14 |
| 5,031,984 | 7/1991 | Eide et al. | 385/15 |
| 5,111,518 | 5/1992 | Okada | 385/14 |
| 5,185,752 | 2/1993 | Welch et al. | 372/96 |
| 5,452,118 | 9/1995 | Maruska | 385/14 |
| 5,475,777 | 12/1995 | Imoto et al. | 385/50 |
| 5,479,547 | 12/1995 | Kunikane et al. | 385/14 |
| 5,496,979 | 3/1996 | Behr | 200/61.45 |
| 5,544,268 | 8/1996 | Bischel et al. | 385/16 |

FOREIGN PATENT DOCUMENTS

| | | |
|---|---|---|
| 0452938 | 10/1991 | European Pat. Off. . |
| 3326406 | 2/1985 | Germany . |
| 4230952 | 3/1994 | Germany . |
| 4230952 | 5/1994 | Germany . |
| 1-57210 | 3/1989 | Japan .................. 385/14 |
| 2210991 | 6/1989 | United Kingdom . |
| 2227854 | 8/1990 | United Kingdom . |

OTHER PUBLICATIONS

Translation of Hehmann et al (EP 0597211).
Patent Abstracts of Japan JP 4162023, vol. 16, No. 457, p. 1426 and Japanese Patent Appl. JP 900288700 Oct. 26, 1990.
Patent Abstracts of Japan JP 5333243, vol. 18, No. 162, p. 1712 and Japanese Patent Application JP 920142433 Jun. 3, 1992.

Primary Examiner—Rodney Bovernick
Assistant Examiner—Yisun Song
Attorney, Agent, or Firm—Ware, Pressola, Van Der Sluys & Adolphson LLP

[57] ABSTRACT

An optical duplexer, configured as a directional coupler, is integrated into an optical coupling arrangement with a fiber optic pigtail, constructed in planar-optical hybrid technology on a substrate (1). To reduce the required surface area and decrease optical cross talk, the branch of the directional coupler (waveguide 6, branch 7) is sharply bent. The bend is equipped with a reflecting mirror (11) integrated opposite the inner edge (10) of the bend. Furthermore, the waveguiding end of the bent branch (7) is equipped with a cylindrical lens. A laser diode (8) is located before this, and a photodiode (5) is located before the angled end of the straight-line integrated waveguide (2).

10 Claims, 1 Drawing Sheet

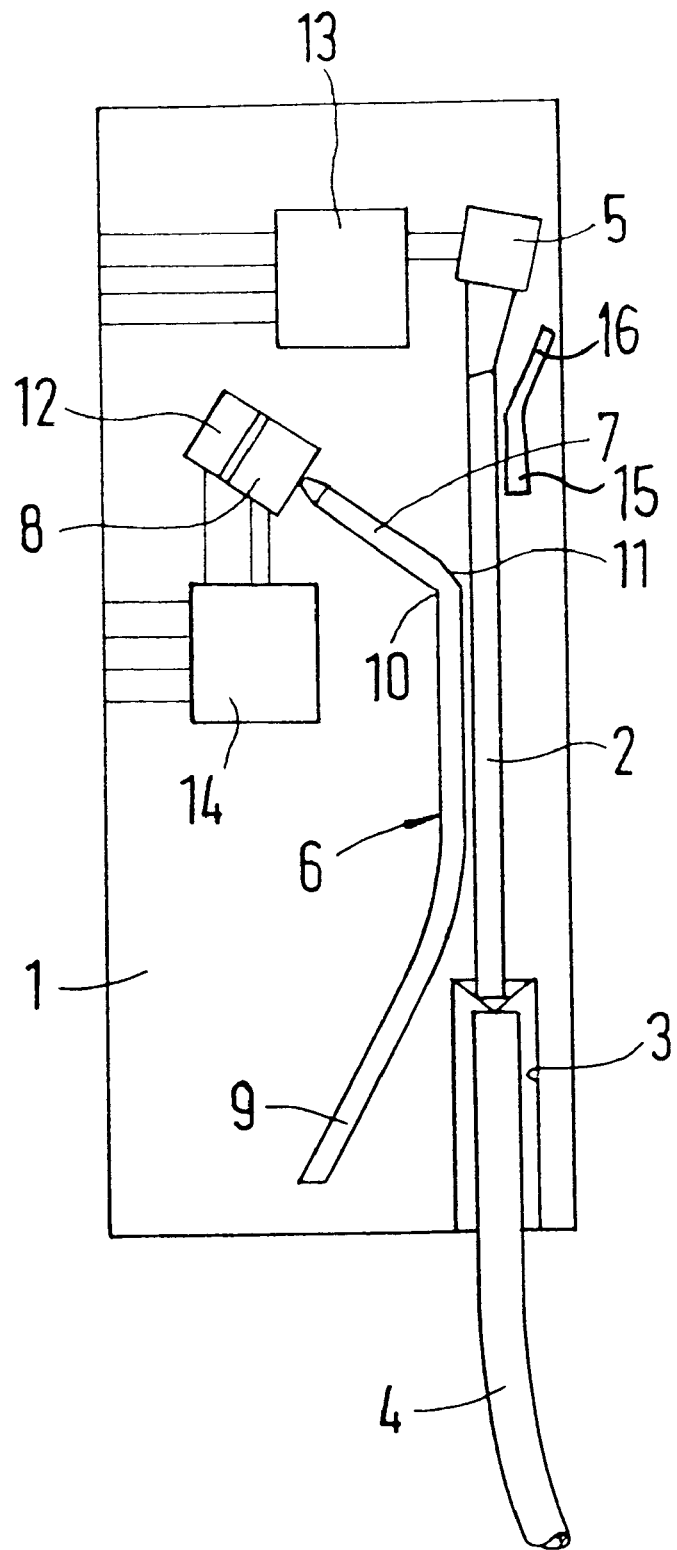

OPTICAL COUPLING ARRANGEMENT

TECHNICAL FIELD

The invention relates to an optical coupling arrangement for use in optical communication systems.

BACKGROUND OF THE INVENTION

A configuration example of an optical duplexer is known from DE 42 30 952 A1, in which a silicon substrate equipped with integrated optical functional units is affixed in a housing, among others. The silicon substrate supports a beam splitter, which is integrated in the form of optical line paths and acts as a directionally selective wavelength coupler. A semiconductor laser diode is coupled before one end of a first straight line path, and a fiber optic pigtail is coupled to the other end of this line path. A second optical line path, which is coupled to the first line path by a cut that runs parallel to it, ends in a bent cut before a photodiode which is affixed to the silicon substrate.

DISCLOSURE OF INVENTION

The invention has the task of reducing a substrate surface required for an optical coupling arrangement with a first optical waveguide integrated on the substrate, and a second branched optical waveguide in parallel thereto, and to improve its performance. The invention fulfills this task with a branching portion of the second optical waveguide being bent and equipped with a reflecting mirror opposite an edge of the bend.

According further to the invention, the coupling arrangement is constructed as a transceiver with a duplexer on the substrate.

In further accord with the invention, the ends of the first optical waveguide are coupled to a photodiode and to a fiber optic pigtail affixed to a groove in the substrate, and one end of the second optical waveguide is coupled to a laser diode. The end of the bent branch may be equipped with a cylindrical lens, and the laser diode may be located before the cylindrical lens. Moreover, a free end of the second optical waveguide may be built as a sump to suppress reflections, and the end of the first optical waveguide, on which the photodiode is located, can be angled to prevent backward reflections. Furthermore, another optical waveguide may be coupled to the first optical waveguide, whose free end leads into the sump and decouples and suppresses portions of signals in the first optical waveguide that originate from the laser diode, which are reflected in the direction of the photodiode. The coupling areas formed by the first optical waveguide, the second optical waveguide and the other optical waveguide, which represent directional couplers, may be designed so that the middle frequencies of their suppressed band areas are provided slightly displaced with respect to each other.

These and other objects, features and advantages of the present invention will become more apparent in light of the detailed description of a best mode embodiment thereof, as illustrated in the accompanying drawing.

BRIEF DESCRIPTION OF THE DRAWING

The sole FIGURE shows a configuration example of an optical coupler according to the invention, illustrated in a top view.

BEST MODE FOR CARRYING OUT THE INVENTION

In the FIGURE, the reference numeral 1 denotes a rectangular substrate. The substrate 1, which is made of silicon or quartz for example, supports a first optical waveguide 2 made of $SiO_2$, which runs parallel and in a straight line at a specified distance from one lengthwise edge. Before one of its ends, a fiber optic pigtail 4 is located in a groove 3 with a V-shaped cross section, and a semiconductor photodiode 5 is located at the other end of this waveguide 2. The end of the waveguide which faces the photodiode 5 is at an angle to prevent backward reflections.

A second optical waveguide 6 made of $SiO_2$, which is integrated into the substrate 1 and is coupled to the first waveguide 2 with a parallel running cut, ends in a bent branch 7 before a semiconductor laser diode 8. The other free end of this waveguide 6, which contains a bend with a relatively large radius, is configured as a sump to suppress potential reflections.

To ensure small insertion losses, the necessary branching of both waveguides 2, 6 should take place with as little bending as possible. However, this requires a relatively large space on the substrate. To better utilize the substrate surface and the required space, a sharp bend is provided in the branch 7 of the second optical waveguide 6 facing the laser diode 8, in the coupling area which runs parallel to the first optical waveguide 2, and the sharply contoured bend is equipped with a reflecting mirror 11 which is integrated opposite the inner edge 10 of the bend. Directly at the end of the coupling area, or shortly after the bend, i.e. an area in which the waveguides 2, 7 are already optically separated from each other, the reflecting mirror 11, which can be manufactured with dry etching technology, permits arranging the branch 7 of the second optical waveguide 6, which leads to the laser diode 8, at an angle of 45° with respect to the first optical waveguide 2. To improve the coupling efficiency of the laser diode 8, the waveguiding end of this branch 7 is equipped with a cylindrical lens, which can be manufactured with the same etching technology as the reflecting mirror 11.

The branch 7, which is sharply bent from the coupling waveguiding area, permits the installation of an amplifier circuit 13 on the substrate surface between the laser diode 8, which is potentially coupled to an integrated monitor diode 12, and the photodiode 5. The drive electronics 14 for the laser and monitor diodes 8, 12 can be located under the laser diode 8, in the area next to the coupling area of the second optical waveguide 6.

The planar-optically constructed transceiver, with the optical duplexer indicated in the drawing as a directional coupler, can be cost-effectively manufactured in a monolithic configuration with hybrid technology and using other suitable substrate materials, and imbedded in plastic to protect it against effects of the environment, depending on the number of pieces required. In addition, the widely spaced placement of photodiode 5 and laser diode 8 strongly reduces electrical cross talk.

To filter out portions of the signal emitted by the laser diode 8, which are reflected in disturbance areas in the first optical waveguide 2, and in the receiving direction of the fiber optic pigtail 4 which follows the transmission direction, and disrupt the reception by the photodiode, another optical is can be coupled to the first optical waveguide between the bend of the second optical waveguide and the end of the first optical waveguide, which is coupled to the photodiode. Like the second optical waveguide, it is integrated on the substrate where it is bent 16 and leads to a sump along a coupling area which is parallel to the first optical waveguide and runs in the direction of the photodiode.

If the coupling areas formed by the first optical waveguide and the other two optical waveguides are designed so that the middle frequencies of the suppressed band areas in the resulting directional couplers are slightly displaced with respect to each other, a larger width of the suppressed band areas can be achieved, and thereby better decoupling of the sending and receiving branches.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An optical coupling arrangement with a first optical waveguide (2) integrated on a substrate, and a second branched optical waveguide (6) in parallel thereto and positioned alongside the first optical waveguide, characterized in that a branching portion of the second optical waveguide (6) is bent away from the first optical waveguide (2) into a bend (10) and the second optical waveguide is equipped with a reflecting mirror (11) opposite an edge of the bend (10), and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

2. An optical coupling arrangement as claimed in claim 1, characterized in that coupling areas formed by the first optical waveguide (2), the second optical waveguide (6) and the other optical waveguide, which represent directional couplers, are provided so that the middle frequencies of suppressed band areas thereof are displaced with respect to each other.

3. An optical coupling arrangement with a first optical waveguide (2) integrated on a substrate, and a second branched optical waveguide (6) in parallel thereto and positioned alongside the first optical waveguide, characterized in that a branching portion of the second optical waveguide (6) is bent away from the first optical waveguide (2) into a bend (10) and the second optical waveguide is equipped with a reflecting mirror (11) opposite an edge of the bend (10), and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that an end of a bent branch (7) of the branching portion of the second optical waveguide is equipped with a cylindrical lens, and that the laser diode (8) is located before the cylindrical lens, and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

4. An optical coupling arrangement with a first optical waveguide (2) integrated on a substrate, and a second branched optical waveguide (6) in parallel thereto and positioned alongside the first optical waveguide, characterized in that a branching portion of the second optical waveguide (6) is bent away from the first optical waveguide (2) into a bend (10) and the second optical waveguide is equipped with a reflecting mirror (11) opposite an edge of the bend (10), and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that an end of a bent branch (7) of the branching portion of the second optical waveguide is equipped with a cylindrical lens, and that the laser diode (8) is located before the cylindrical lens, and further characterized in that a free end (9) of the second optical waveguide (6) is built as a sump to suppress reflections, and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

5. An optical coupling arrangement with a first optical waveguide (2) integrated on a substrate, and a second branched optical waveguide (6) in parallel thereto and positioned alongside the first optical waveguide, characterized in that a branching portion of the second optical waveguide (6) is bent away from the first optical waveguide (2) into a bend (10) and the second optical waveguide is equipped with a reflecting mirror (11) opposite an edge of the bend (10), and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that an end of the first optical waveguide (2) to which the photodiode (5) is coupled, is angled to prevent backward reflections, and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

6. An optical coupling arrangement with a first optical waveguide (2) integrated on a substrate, and a second optical waveguide (6) in parallel thereto in a coupling area and having a branching portion (7) branching away from said coupling area and occupying a surface area on said substrate adjacent said first optical waveguide, characterized in that said branching portion (7) of the second optical waveguide (6) is bent from the coupling area in a bend (10) for reducing said surface area otherwise occupied by said branching portion without said bend and wherein said band is equipped with a reflecting mirror (11) opposite an edge of the bend for ensuring small insertion losses, and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

7. An optical coupling arrangement as claimed in claim 6, characterized in that coupling areas formed by the first optical waveguide (2), the second optical waveguide (6) and the other optical waveguide, which represent directional couplers, are provided so that the middle frequencies of suppressed band areas thereof are displaced with respect to each other.

8. An optical coupling arrangement with a first optical waveguide (2) integrated on a substrate, and a second optical waveguide (6) in parallel thereto in a coupling area and having a branching portion (7) branching away from said coupling area and occupying a surface area on said substrate adjacent said first optical waveguide, characterized in that said branching portion (7) of the second optical waveguide (6) is bent from the coupling area in a bend (10) for reducing said surface area otherwise occupied by said branching portion without said bend and wherein said band is equipped with a reflecting mirror (11) opposite an edge of the bend for ensuring small insertion losses, and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that an end of a bent branch (7) of the branching portion of the second optical waveguide is equipped with a cylindrical lens, and that the laser diode (8) is located before the cylindrical lens, and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

9. An optical coupling arrangement with a first optical waveguide (2) integrated on a substrate, and a second optical waveguide (6) in parallel thereto in a coupling area and having a branching portion (7) branching away from said coupling area and occupying a surface area on said substrate adjacent said first optical waveguide, characterized in that said branching portion (7) of the second optical waveguide (6) is bent from the coupling area in a bend (10) for reducing said surface area otherwise occupied by said branching portion without said bend and wherein said band is equipped with a reflecting mirror (11) opposite an edge of the bend for ensuring small insertion losses, and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that an end of a bent branch (7) of the branching portion of the second optical waveguide is equipped with a cylindrical lens, and that the laser diode (8) is located before the cylindrical lens, and further characterized in that a free end (9) of the second optical waveguide (6) is built as a sump to suppress reflections, and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

10. An optical coupling arrangement with a first optical waveguide (2) integrated on a substrate, and a second optical waveguide (6) in parallel thereto in a coupling area and having a branching portion (7) branching away from said coupling area and occupying a surface area on said substrate adjacent said first optical waveguide, characterized in that said branching portion (7) of the second optical waveguide (6) is bent from the coupling area in a bend (10) for reducing said surface area otherwise occupied by said branching portion without said bend and wherein said band is equipped with a reflecting mirror (11) opposite an edge of the bend for ensuring small insertion losses, and further characterized in that ends of the first optical waveguide (2) are coupled to a photodiode (5) and to a fiber optic pigtail (4) affixed to a groove (3) in the substrate (1), and one end of the second optical waveguide (6) is coupled to a laser diode (8), and further characterized in that an end of the first optical waveguide (2) to which the photodiode (5) is coupled, is angled to prevent backward reflections, and further characterized in that another optical waveguide is coupled to the first optical waveguide (2) between the bend (10) of the second optical waveguide (6) and the end of the first optical waveguide which is coupled to the photodiode (5), having a free end that leads into a sump and that decouples and suppresses portions of signals in the first optical waveguide that originate from the laser diode (8), which are reflected in a direction toward the photodiode (5).

* * * * *